United States Patent
Hogan et al.

(10) Patent No.: US 9,868,805 B2
(45) Date of Patent: *Jan. 16, 2018

(54) POLYDIENES AND DIENE COPOLYMERS HAVING ORGANOPHOSPHINE FUNCTIONALITY

(71) Applicants: Bridgestone Corporation, Tokyo (JP); Terrence E. Hogan, Akron, OH (US); William L. Hergenrother, Akron, OH (US); David M. Roggeman, Akron, OH (US)

(72) Inventors: Terrence E. Hogan, Uniontown, OH (US); William L. Hergenrother, Akron, OH (US); David M. Roggeman, North Royalton, OH (US)

(73) Assignee: Bridgestone Corporation, Tokyo (JP)

( * ) Notice: Subject to any disclaimer, the term of this patent is extended or adjusted under 35 U.S.C. 154(b) by 299 days.

This patent is subject to a terminal disclaimer.

(21) Appl. No.: 14/398,644

(22) PCT Filed: May 1, 2013

(86) PCT No.: PCT/US2013/039031
§ 371 (c)(1),
(2) Date: Nov. 3, 2014

(87) PCT Pub. No.: WO2013/166124
PCT Pub. Date: Nov. 7, 2013

(65) Prior Publication Data
US 2015/0126675 A1    May 7, 2015

Related U.S. Application Data

(60) Provisional application No. 61/779,399, filed on Mar. 13, 2013, provisional application No. 61/640,915, filed on May 1, 2012.

(51) Int. Cl.
| | | |
|---|---|---|
| *C08F 130/02* | (2006.01) |
| *C08F 236/06* | (2006.01) |
| *C08F 236/04* | (2006.01) |
| *C08K 3/04* | (2006.01) |
| *C08K 3/36* | (2006.01) |
| *C08F 230/02* | (2006.01) |

(52) U.S. Cl.
CPC .......... *C08F 236/06* (2013.01); *C08F 236/04* (2013.01); *C08K 3/04* (2013.01); *C08K 3/36* (2013.01); *C08F 230/02* (2013.01)

(58) Field of Classification Search
CPC ..... C08F 130/02; C08F 230/02; C08F 236/10
See application file for complete search history.

(56) References Cited

U.S. PATENT DOCUMENTS

| | | | |
|---|---|---|---|
| 3,312,674 A | 4/1967 | Welch | |
| 3,350,477 A | 10/1967 | Cooper | |
| 3,422,079 A | 1/1969 | Paxton et al. | |
| 3,437,719 A | 4/1969 | Zutty et al. | |
| 3,519,607 A * | 7/1970 | Welch | C08F 30/02 526/187 |
| 3,624,057 A | 11/1971 | Farrar | |
| 3,784,637 A | 1/1974 | Farrar | |
| 3,987,009 A | 10/1976 | Young | |
| 5,717,042 A * | 2/1998 | Hall | C08F 36/04 526/173 |
| 2009/0229729 A1 | 9/2009 | Woloszynek | |

FOREIGN PATENT DOCUMENTS

| | | |
|---|---|---|
| EP | 0856532 | 8/1998 |
| JP | 10218908 | 8/1998 |
| JP | 2007091824 A | 4/2007 |
| JP | 2008-115278 * | 5/2008 |
| JP | 2008115278 | 5/2008 |
| JP | 2009221203 | 10/2009 |

OTHER PUBLICATIONS

Paisley et al. Journal of Polymer Science 1962, 56, 533-538.*
Adams, Florian, International Search Report with Written Opinion from PCT/US2013/039031, 9 pp. (Aug. 13, 2013).
Dessy, Raymond E. et al., "Organometallic Electrochemistry. III. Organometallic Anions Derived from Group V Elements," Journal of the American Chemical Society, vol. 88, Issue 3, pp. 467-470 (Feb. 1, 1966).
Dogan, John et al., "Mechanism of Phosphorus-Carbon Bond Cleavage by Lithium in Tertiary Phosphines. An Optimized Synthesis of 1,2-Bis(phenylphosphino)ethane," J. Org. Chem, vol. 65, pp. 951-957 (Feb. 25, 2000).
Lindsell, W.E. et al., "The preparation and characterization of phosphorus-terminated poly-1,3-butadiene: new telechelic ionomers," Polymer, vol. 31, pp. 1374-1378 (Jul. 1990).
Nandi, Partha et al., "Preparation of Diphenyl Phosphide and Substituted Phosphines using Alkali Metal in Silica Gel (M-SG)," Organic Letters, vol. 11, Issue 8, pp. 1689-1692 (Apr. 18, 2009).
Chinese Office Action, Application. No. 201380030181.6, dated Feb. 14, 2016, 8 pages.

* cited by examiner

*Primary Examiner* — Mark Kaucher
(74) *Attorney, Agent, or Firm* — Meredith E. Hooker; Arthur M. Reginelli

(57) ABSTRACT

Embodiments provide polydienes and diene copolymers having organophosphines functionality. Specific embodiments employ phosphorus-containing organometal initiators and copolymers prepared by anionically polymerizing conjugated diene monomer and vinyl organophosphine.

10 Claims, No Drawings

POLYDIENES AND DIENE COPOLYMERS HAVING ORGANOPHOSPHINE FUNCTIONALITY

This application claims the benefit of U.S. Provisional Application Ser. No. 61/640,915, filed on May 1, 2012, and U.S. Provisional Application Ser. No. 61/779,399, filed on Mar. 13, 2013, which are incorporated herein by reference.

FIELD OF THE INVENTION

Embodiments of the present invention provide polydienes and diene copolymers having organophosphines functionality. Specific embodiments are directed toward the preparation of functional polymers by employing phosphorus-containing organometal initiators. Other specific embodiments provide copolymers prepared by anionically polymerizing conjugated diene monomer and vinyl organophosphine.

BACKGROUND OF THE INVENTION

Anionic polymerization techniques have been used to synthesize polymers that are useful in the manufacture of tires. Using these techniques, certain organometallic compounds can be used to initiate the polymerization of monomer such as conjugated diene monomer. Due to the mechanism by which the initiation and polymerization proceeds, the organometallic compound adds to monomer to form a polymer chain wherein the organo substituent of the initiator is attached as the head group of the polymer. Common initiators include organo lithium species such as n-butyl lithium.

Certain initiators impart a functional group to the polymer. These functional groups may include a heteroatom or metal that can have a desirable impact on the polymer or compositions containing the polymer. For example, where the polymers are employed in the manufacture of tire treads, the functional group can lower the hysteresis loss of the tread vulcanizate. This lowering of hysteresis loss may result from interaction between the functional group and the filler, although other mechanisms have also been proposed.

Tributyl tin lithium compounds have been used to initiate conjugated dienes (optionally together with copolymerizable monomer) to form vulcanizable polymers (i.e., rubber) that, when used in treads, has a desirable impact on the performance of the tread. Likewise, lithiated cyclic imines (e.g., lithio hexamethyleneimine) have also been used to initiate the polymerization of similar polymers and provide rubber with desirable performance in tire treads. Still other examples include lithiated thioacetals (e.g., 2-lithio-1,3-dithianes). Still further, the use of lithium dialkylphosphines in conjunction with phosphine oxide modifiers have been proposed.

The selection of useful initiator compounds, however, is not trivial. This is especially true where there is a desire to select initiator compounds that have a desirable impact on filled rubber compositions or vulcanizates, such as tire treads. Indeed, the prior art only includes a few types of compounds that are useful. This difficulty derives from several factors. For example, the anionic polymerization of conjugated dienes is sensitive, and many compounds or substituents can poison the polymerization system. And, the selection of substituents or functional groups that can impact filled compositions, such as tire treads, is difficult to predict.

Because functional initiators remain desirable, particularly for the synthesis for functionalized polymers that are used in the manufacture of tires, there is a continued desire to identify initiators that can lead to technologically useful polymers and that have desirable impact on filled rubber compositions and/or vulcanizates.

SUMMARY OF THE INVENTION

One or more embodiments of the present invention provide a method for preparing a functionalized polymer, the method comprising: polymerizing conjugated diene monomer, optionally together with comonomer, using a phosphorus-containing organometal initiator.

Other embodiments of the present invention provide a method for preparing a polymer, the method comprising: preparing an initiator by reacting a vinyl organophosphine with an organometal compound; and polymerizing conjugated diene monomer, optionally together with comonomer, by initiating the polymerization of the monomer with the initiator.

Still other embodiments of the present invention provide a functionalized polymer defined by the Formula V:

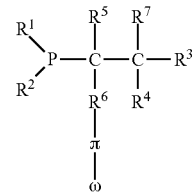

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group.

Yet other embodiments provide a functionalized polymer defined by the Formula VI:

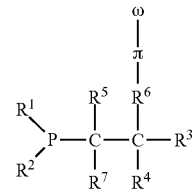

where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group.

Other embodiments of the present invention provide a process for preparing a copolymer including one or more phosphorus-containing mer units, the process comprising anionically polymerizing conjugated diene monomer, vinyl organophosphine monomer, and optionally monomer copolymerizable therewith.

Still other embodiments of the present invention also provide a copolymer having one or more phosphorus-containing mer units defined by the formula VII:

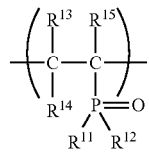

where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^3$ and $R^4$ join to form a divalent organic group.

Other embodiments provide a copolymer having one or more phosphorus-containing mer units defined by the formula VIII:

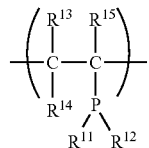

where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group.

Still other embodiments of the present invention provide a functionalized polymer defined by the Formula IX:

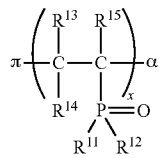

where $\pi$ is a polymer chain, $\alpha$ is a functional group or hydrogen atom, $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group.

And other embodiments of the present invention provide a functionalized polymer defined by the Formula X:

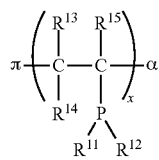

where $\pi$ is a polymer chain, $\alpha$ is a functional group or hydrogen atom, $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group.

DETAILED DESCRIPTION OF ILLUSTRATIVE EMBODIMENTS

Embodiments of the present invention are based, at least in part, on the discovery of polydienes and diene copolymers that include an organophosphine functionality. Certain aspects of the present invention are based, at least in part, on the discovery of a method for initiating the anionic polymerization of diene monomer, optionally together with comonomer, using phosphorus-containing organometal compounds. While the prior art contemplates the use of lithium dialkyl phosphides, which are lithiated phosphines, the present invention employs an initiator where the phosphorus atom is directly bonded to a carbon atom. As a result, it is believed that the polymers produced by practice of the present invention have a phosphorus-containing headgroup that is more stable than those proposed in the prior art. Other aspects of the present invention are based, at least in part, on the discovery of copolymers of conjugated diene, vinyl organophosphine, and optionally monomer copolymerizable therewith prepared by anionic polymerization techniques. These copolymers are advantageously linear and have a relatively low molecular weight distribution. Thus, while the prior art contemplates the copolymerization of dienes and vinyl organophosphines using radical polymerization, the ability to copolymerize these monomer using anionic polymerization techniques offers several advantages. In one or more embodiments, the vinyl organophosphine monomer is charged after substantial polymerization of the primary monomer (i.e., the conjugated diene monomer), and therefore the resulting copolymer includes end-functionalization resulting from the addition of the vinyl organophosphine monomer at the chain end.

Vinyl Organophosphine

One or more embodiments of the present invention employ vinyl organophosphines, which may also be referred to as vinyl organophosphine monomer or simply vinyl phosphines. In one or more embodiments, vinyl organophosphines may be defined by the formula I:

Formula I

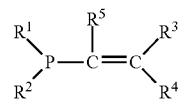

where $R^1$ and $R^2$ are each independently monovalent organic groups, or where $R^1$ and $R^2$ join to form a divalent organic group, and where $R^3$, $R^4$, and $R^5$ are each independently hydrogen or monovalent organic groups, or where $R^3$ and $R^4$ join to form a divalent organic group. In particular embodiments, $R^3$, $R^4$, and $R^5$ are hydrogen atoms.

In one or more embodiments, the monovalent organic group is a hydrocarbyl group or substituted hydrocarbyl group. Examples of hydrocarbyl groups or substituted hydrocarbyl groups include, but are not limited to, alkyl, cycloalkyl, substituted cycloalkyl, alkenyl, cycloalkenyl, aryl, substituted aryl groups, and heterocyclic groups. The hydrocarbyl group may contain heteroatoms such as, but not limited to, nitrogen, oxygen, silicon, tin, sulfur, boron, and phosphorous atoms. In one or more embodiments, the monovalent organic group may include at least 1, or the minimum number of carbon atoms required to form a group, up to about 12 carbon atoms. The term substituted is used in its conventional sense to refer to organic groups, such as alkyl groups, that replace a hydrogen atom in a parent organic group.

In one or more embodiments, types of vinyl organophosphines include vinyldihydrocarbyl phosphines, dihydrocarbyl(2,2-dihydrocarbyl-1-hydrocarbylvinyl)phosphines, dihydrocarbyl(2,2-dihydrocarbylvinyl)phosphines, dihydrocarbyl(2-hydrocarbylvinyl)phosphines, dihydrocarbyl(2-hydrocarbyl-1-hydrocarbylvinyl)phosphines, and dihydrocarbyl(1-hydrocarbylvinyl)phosphines.

Specific examples of vinyldihydrocarbyl phosphines include vinyldiphenylphosphine, vinyldicyclohexylphosphine, vinyldicyclopentylphosphine, vinyldimethylphosphine, vinyldiethylphosphine, vinyldi-n-propylphosphine, vinyldi-t-butylphosphine, vinyldi-n-octylphosphine, vinyldi-n-dodecylphosphine, vinyldipiperidylphosphine, vinyldipyrrolidylphosphine, vinyldipyridylphosphine, and vinyldipyrrylphosphine.

Specific examples of dihydrocarbyl(2,2-dihydrocarbyl-1-hydrocarbylvinyephosphines include dimethyl(2,2-diphenyl-1-methylvinyl)phosphine, diethyl(2,2-diphenyl-1-methylvinyl)phosphine, di-n-propyl(2,2-diphenyl-1-methylvinyl)phosphine, di-t-butyl(2,2-diphenyl-1-methylvinyl)phosphine, di-n-octyl(2,2-diphenyl-1-methylvinyl)phosphine, di-n-dodecyl(2,2-diphenyl-1-methylvinyl) phosphine, diphenyl(2,2-diphenyl-1-methylvinyl)phosphine, dicyclohexyl(2,2-diphenyl-1-methylvinyl)phosphine, dicyclopentyl(2,2-diphenyl-1-methylvinyl)phosphine, dipiperidyl(2,2-diphenyl-1-methylvinyl)phosphine, dipyrrolidyl(2,2-diphenyl-1-methylvinyl)phosphine, dipyridyl(2,2-diphenyl-1-methylvinyl)phosphine, dipyrryl(2,2-diphenyl-1-methylvinyl)phosphine, dimethyl(2,2-diethyl-1-ethylvinyl)phosphine, diethyl(2,2-diethyl-1-ethylvinyl)phosphine, di-n-propyl(2,2-diethyl-1-ethylvinyl)phosphine, di-t-butyl(2,2-diethyl-1-ethylvinyl)phosphine, di-n-octyl(2,2-diethyl-1-ethylvinyl)phosphine, di-n-dodecyl(2,2-diethyl-1-ethylvinyl)phosphine, diphenyl(2,2-diethyl-1-ethylvinyl)phosphine, dicyclohexyl(2,2-diethyl-1-ethylvinyl)phosphine, dicyclopentyl(2,2-diethyl-1-ethylvinyl)phosphine, dipiperidyl(2,2-diethyl-1-ethylvinyl)phosphine, dipyrrolidyl(2,2-diethyl-1-ethylvinyl)phosphine, dipyridyl(2,2-diethyl-1-ethylvinyl)phosphine, dipyrryl(2,2-diethyl-1-ethylvinyl)phosphine, dimethyl(2,2-dicyclohexyl-1-propylvinyl)phosphine, diethyl(2,2-dicyclohexyl-1-propylvinyl)phosphine, di-n-propyl(2,2-dicyclohexyl-1-propylvinyl)phosphine, di-t-butyl(2,2-dicyclohexyl-1-propylvinyl)phosphine, di-n-octyl(2,2-dicyclohexyl-1-propylvinyl)phosphine, di-n-dodecyl(2,2-dicyclohexyl-1-propylvinyl)phosphine, diphenyl(2,2-dicyclohexyl-1-propylvinyl)phosphine, dicyclohexyl(2,2-dicyclohexyl-1-propylvinyl)phosphine, dicyclopentyl(2,2-dicyclohexyl-1-propylvinyl)phosphine, dipiperidyl(2,2-dicyclohexyl-1-propylvinyl)phosphine, dipyrrolidyl(2,2-dicyclohexyl-1-propylvinyl)phosphine, dipyridyl(2,2-dicyclohexyl-1-propylvinyl)phosphine, dipyrryl(2,2-dicyclohexyl-1-propylvinyl)phosphine, dimethyl(2,2-dipyridyl-1-ethylvinyl)phosphine, diethyl(2,2-dipyridyl-1-ethylvinyl)phosphine, di-n-propyl(2,2-dipyridyl-1-ethylvinyl)phosphine, di-t-butyl(2,2-dipyridyl-1-ethylvinyl)phosphine, di-n-octyl(2,2-dipyridyl-1-ethylvinyl)phosphine, di-n-dodecyl(2,2-dipyridyl-1-ethylvinyl)phosphine, diphenyl(2,2-dipyridyl-1-ethylvinyl)phosphine, dicyclohexyl(2,2-dipyridyl-1-ethylvinyl)phosphine, dicyclopentyl(2,2-dipyridyl-1-ethylvinyl)phosphine, dipiperidyl(2,2-dipyridyl-1-ethylvinyl)phosphine, dipyrrolidyl(2,2-dipyridyl-1-ethylvinyl)phosphine, dipyridyl(2,2-dipyridyl-1-ethylvinyl)phosphine, and dipyrryl(2,2-dipyridyl-1-ethylvinyl)phosphine.

Specific examples of dihydrocarbyl(2,2-dihydrocarbylvinyl)phosphines include dimethyl(2,2-diphenylvinyl)phosphine, diethyl(2,2-diphenylvinyl)phosphine, di-n-propyl(2,2-diphenylvinyl)phosphine, di-t-butyl(2,2-diphenylvinyl)phosphine, di-n-octyl(2,2-diphenylvinyl)phosphine, di-n-dodecyl(2,2-diphenylvinyl)phosphine, diphenyl(2,2-diphenylvinyl)phosphine, dicyclohexyl(2,2-diphenylvinyl)phosphine, dicyclopentyl(2,2-diphenylvinyl)phosphine, dipiperidyl(2,2-diphenylvinyl)phosphine, dipyrrolidyl(2,2-diphenylvinyl)phosphine, dipyridyl(2,2-diphenylvinyl)phosphine, dipyrryl(2,2-diphenylvinyl)phosphine, dimethyl(2,2-diethylvinyl)phosphine, diethyl(2,2-diethylvinyl)phosphine, di-n-propyl(2,2-diethylvinyl)phosphine, di-t-butyl(2,2-diethylvinyl)phosphine, di-n-octyl(2,2-diethylvinyl)phosphine, di-n-dodecyl(2,2-diethylvinyl)phosphine, diphenyl(2,2-diethylvinyl)phosphine, dicyclohexyl(2,2-diethylvinyl)phosphine, dicyclopentyl(2,2-diethylvinyl)phosphine, dipiperidyl(2,2-diethylvinyl)phosphine, dipyrrolidyl(2,2-diethylvinyl)phosphine, dipyridyl(2,2-diethylvinyl)phosphine, dipyrryl(2,2-diethylvinyl)phosphine, dimethyl(2,2-dicyclohexylvinyl)phosphine, diethyl(2,2-dicyclohexylvinyl)phosphine, di-n-propyl(2,2-dicyclohexylvinyl)phosphine, di-t-butyl(2,2-dicyclohexylvinyl)phosphine, di-n-octyl(2,2-dicyclohexylvinyl)phosphine, di-n-dodecyl(2,2-dicyclohexylvinyl)phosphine, diphenyl(2,2-dicyclohexylvinyl)phosphine, dicyclohexyl(2,2-dicyclohexylvinyl)phosphine, dicyclopentyl(2,2-dicyclohexylvinyl)phosphine, dipiperidyl(2,2-dicyclohexylvinyl)phosphine, dipyrrolidyl(2,2-dicyclohexylvinyl)phosphine, dipyridyl(2,2-dicyclohexylvinyl)phosphine, dipyrryl(2,2-dicyclohexylvinyl)phosphine, dimethyl(2,2-dipyridylvinyl)phosphine, diethyl(2,2-dipyridylvinyl)phosphine, di-n-propyl(2,2-dipyridylvinyl)phosphine, di-t-butyl(2,2-dipyridylvinyl)phosphine, di-n-octyl(2,2-dipyridylvinyl)phosphine, di-n-dodecyl(2,2-dipyridylvinyl)phosphine, diphenyl(2,2-dipyridylvinyl)phosphine, dicyclohexyl(2,2-dipyridylvinyl)phosphine, dicyclopentyl(2,2-dipyridylvinyl)phosphine, dipiperidyl(2,2-dipyridylvinyl)phosphine, dipyrrolidyl(2,2-dipyridylvinyl)phosphine, dipyridyl(2,2-dipyridylvinyl)phosphine, and dipyrryl(2,2-dipyridylvinyl)phosphine.

Specific examples of dihydrocarbyl(2-hydrocarbylvinyl) phosphines include dimethyl(2-phenylvinyl)phosphine, diethyl(2-phenylvinyl)phosphine, di-n-propyl(2-phenylvinyl)phosphine, di-t-butyl(2-phenylvinyl)phosphine, di-n-octyl(2-phenylvinyl)phosphine, di-n-dodecyl(2-phenylvinyl)phosphine, diphenyl(2-phenylvinyl)phosphine, dicyclohexyl(2-phenylvinyl)phosphine, dicyclopentyl(2-phenylvinyl)phosphine, dipiperidyl(2-phenylvinyl)phosphine, dipyrrolidyl(2-phenylvinyl)phosphine, dipyridyl(2-phenylvinyl)phosphine, dipyrryl(2-phenylvinyl)phosphine, dimethyl(2-ethylvinyl)phosphine, diethyl(2-ethylvinyl)phosphine, di-n-propyl(2-ethylvinyl)phosphine, di-t-butyl(2-ethylvinyl)phosphine, di-n-octyl(2-ethylvinyl)phosphine, di-n-dodecyl(2-ethylvinyl)phosphine, diphenyl(2-ethylvinyl)phosphine, dicyclohexyl(2-ethylvinyl)phosphine, dicyclopentyl(2-ethylvinyl)phosphine, dipiperidyl(2-ethylvinyl)phosphine, dipyrrolidyl(2-ethylvinyl)phosphine, dipyridyl(2-ethylvinyl)phosphine, dipyrryl(2-ethylvinyl)phosphine, dimethyl(2-cyclohexylvinyl)phosphine, diethyl(2-cyclohexylvinyl)phosphine, di-n-propyl(2-cyclohexylvinyephosphine, di-t-butyl(2-cyclohexylvinyl)phosphine, di-n-octyl(2-cyclohexylvinyl)phosphine, di-n-dodecyl(2- cyclohexylvinyl)phosphine, diphenyl(2-cyclohexylvinyl)phosphine, dicyclohexyl(2-cyclohexylvinyl)phosphine, dicyclopentyl(2-cyclohexylvinyl)phosphine, dipiperidyl(2-cyclohexylvinyl)phosphine, dipyrrolidyl(2-cyclohexylvinyl)phosphine, dipyridyl(2-cyclohexylvinyl)phosphine, dipyrryl(2-cyclohexylvinyl)phosphine, dimethyl(2-pyridylvinyl)phosphine, diethyl(2-pyridylvinyl)phosphine, di-n-propyl(2-pyridylvinyl)phosphine, di-t-butyl(2-pyridylvinyl)phosphine, di-n-octyl(2-pyridylvinyl)phosphine, di-n-dodecyl(2-pyridylvinyl)phosphine, diphenyl(2-pyridylvinyl)phosphine, dicyclohexyl(2-pyridylvinyl)phosphine, dicyclopentyl(2-pyridylvinyl)phosphine, dipiperidyl(2-pyridylvinyl)phosphine, dipyrrolidyl(2-pyridylvinyl)phosphine, dipyridyl(2-pyridylvinyl)phosphine, and dipyrryl(2-pyridylvinyl)phosphine.

Specific examples of dihydrocarbyl(2-hydrocarbyl-1-hydrocarbylvinyl)phosphines include dimethyl(2-phenyl-1-methylvinyl)phosphine, diethyl(2-phenyl-1-methylvinyl)phosphine, di-n-propyl(2-phenyl-1-methylvinyl)phosphine, di-t-butyl(2-phenyl-1-methylvinyl)phosphine, di-n-octyl(2-phenyl-1-methylvinyl)phosphine, di-n-dodecyl(2-phenyl-1-methylvinyl)phosphine, diphenyl(2-phenyl-1-methylvinyl)phosphine, dicyclohexyl(2-phenyl-1-methylvinyl)phosphine, dicyclopentyl(2-phenyl-1-methylvinyl)phosphine, dipiperidyl(2-phenyl-1-methylvinyl)phosphine, dipyrrolidyl(2-phenyl-1-methylvinyl)phosphine, dipyridyl(2-phenyl-1-methylvinyl)phosphine, dipyrryl(2-phenyl-1-methylvinyl)phosphine, dimethyl(2-ethyl-1-ethylvinyl)phosphine, diethyl(2-ethyl-1-ethylvinyl)phosphine, di-n-propyl(2-ethyl-1-ethylvinyl)phosphine, di-t-butyl(2-ethyl-1-ethylvinyl)phosphine, di-n-octyl(2-ethyl-1-ethylvinyl)phosphine, di-n-dodecyl(2-ethyl-1-ethylvinyl)phosphine, diphenyl(2-ethyl-1-ethylvinyl)phosphine, dicyclohexyl(2-ethyl-1-ethylvinyl)phosphine, dicyclopentyl(2-ethyl-1-ethylvinyl)phosphine, dipiperidyl(2-ethyl-1-ethylvinyl)phosphine, dipyrrolidyl(2-ethyl-1-ethylvinyl)phosphine, dipyridyl(2-ethyl-1-ethylvinyl)phosphine, dipyrryl(2-ethyl-1-ethylvinyl)phosphine, dimethyl(2-cyclohexyl-1-propylvinyl)phosphine, diethyl(2-cyclohexyl-1-propylvinyl)phosphine, di-n-propyl(2-cyclohexyl-1-propylvinyl)phosphine, di-t-butyl(2-cyclohexyl-1-propylvinyl)phosphine, di-n-octyl(2-cyclohexyl-1-propylvinyl)phosphine, di-n-dodecyl(2-cyclohexyl-1-propylvinyl)phosphine, diphenyl(2-cyclohexyl-1-propylvinyl)phosphine, dicyclohexyl(2-cyclohexyl-1-propylvinyl)phosphine, dicyclopentyl(2-cyclohexyl-1-propylvinyl)phosphine, dipiperidyl(2-cyclohexyl-1-propylvinyl)phosphine, dipyrrolidyl(2-cyclohexyl-1-propylvinyl)phosphine, dipyridyl(2-cyclohexyl-1-propylvinyl)phosphine, dipyrryl(2,2-cyclohexyl-1-propylvinyl)phosphine, dimethyl(2-pyridyl-1-ethylvinyl)phosphine, diethyl(2-pyridyl-1-ethylvinyl)phosphine, di-n-propyl(2-pyridyl-1-ethylvinyl)phosphine, di-t-butyl(2-pyridyl-1-ethylvinyl)phosphine, di-n-octyl(2-pyridyl-1-ethylvinyl)phosphine, di-n-dodecyl(2-pyridyl-1-ethylvinyl)phosphine, diphenyl(2-pyridyl-1-ethylvinyl)phosphine, dicyclohexyl(2-pyridyl-1-ethylvinyl)phosphine, dicyclopentyl(2-pyridyl-1-ethylvinyl)phosphine, dipiperidyl(2-pyridyl-1-ethylvinyl)phosphine, dipyrrolidyl(2-pyridyl-1-ethylvinyl)phosphine, dipyridyl(2-pyridyl-1-ethylvinyl)phosphine, and dipyrryl(2-pyridyl-1-ethylvinyephosphine.

Specific examples of dihydrocarbyl(1-hydrocarbylvinyl)phosphines include dimethyl(1-methylvinyl)phosphine, diethyl(1-methylvinyl)phosphine, di-n-propyl (1-methylvinyl)phosphine, di-t-butyl(1-methylvinyl)phosphine, di-n-octyl(1-methylvinyl)phosphine, di-n-dodecyl(1-methylvinyl)phosphine, diphenyl(1-methylvinyl)phosphine, dicyclohexyl (1-methylvinyl)phosphine, dicyclopentyl(1-methylvinyl)phosphine, dipiperidyl(1-methylvinyl)phosphine, dipyrrolidyl(1-methylvinyl)phosphine, dipyridyl(1-methylvinyl)phosphine, dipyrryl(1-methylvinyl)phosphine, dimethyl(1-ethylvinyl)phosphine, diethyl(1-ethylvinyl) phosphine, di-n-propyl(1-ethylvinyl)phosphine, di-t-butyl (1-ethylvinyl)phosphine, di-n-octyl (1-ethylvinyl)phosphine, di-n-dodecyl(1-ethylvinyl)phosphine, diphenyl(1-ethylvinyl)phosphine, dicyclohexyl(1-ethylvinyl)phosphine, dicyclopentyl(1-ethylvinyl)phosphine, dipiperidyl(1-ethylvinyl)phosphine, dipyrrolidyl(1-ethylvinyl)phosphine, dipyridyl(1-ethylvinyl)phosphine, dipyrryl (1-ethylvinyl)phosphine, dimethyl(1-propylvinyl)phosphine, diethyl(1-propylvinyl)phosphine, di-n-propyl(1-propylvinyl)phosphine, di-t-butyl(1-propylvinyl)phosphine, di-n-octyl(1-propylvinyl)phosphine, di-n-dodecyl(1-propylvinyl)phosphine, diphenyl(1-propylvinyl)phosphine, dicyclohexyl(1-propylvinyl)phosphine, dicyclopentyl(1-propylvinyl)phosphine, dipiperidyl(1-propylvinyl)phosphine, dipyrrolidyl(1-propylvinyl)phosphine, dipyridyl(1-propylvinyl)phosphine, and dipyrryl(1-propylvinyl)phosphine.

Phosphorus-Containing Initiator

As indicated above, certain aspects of the invention include preparing polymer and copolymer using a phosphorus-containing organometal compound as an anionic initiator, which may also be referred to as a phosphorus-containing initiator. In one or more embodiments, the phosphorus-containing initiator may be prepared by reacting a vinyl organophosphine with an organometal compound.

Organometal

In one or more embodiments, the organometal may be defined by the formula $M R^7{}_n$, where M is a metal, $R^7$ is a monovalent organic group, and n is equivalent to the valence of the metal. In one or more embodiments, the metal is a group I or group II metal. In particular embodiments, the metal is lithium.

Because organolithium compounds are generally recognized as useful in anionic polymerizations, embodiments of the present invention will be described based upon organolithium compounds or phosphorus-containing organolithium compounds with the understanding that the skilled person will be able to readily extend these teachings to other useful metals. Thus, embodiments of the invention are directed toward phosphorus-containing organolithium compounds prepared by reacting an organolithium compound with vinyl organophosphine.

Exemplary types of organolithium compounds include hydrocarbyl lithiums and substituted hydrocarbyl lithiums such as, but not limited to, alkyllithiums, cycloalkyllithiums, substituted cycloalkyllithiums, alkenyllithiums, cycloalkenyllithiums, substituted cycloalkenyllithiums, aryllithiums, allyllithiums, substituted aryllithiums, aralkyllithiums, alkaryllithiums, and alkynyllithiums, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. Specific examples of useful organolithium compounds include t-butyllithium, n-butyllithium, and isobutyllithium.

As suggested above, the phosphorus-containing organometal compound (e.g., phosphorus-containing organolithium compound) is formed by reacting an organolithium compound with a vinyl organophosphine. The amount of organolithium compound reacted with the vinyl organophosphine may be represented as a molar ratio of organolithium to vinyl organophosphine (Li/P). In one or more embodiments, the molar ratio of organolithium to vinyl organophosphine (Li/P) may be from 0.1:1 to 20:1, in other embodiments from 0.5:1 to 10:1, and in other embodiments from 0.9:1 to 1.5:1.

In one or more embodiments, the phosphorus-containing organolithium compound is pre-formed, which includes reacting the organolithium and the vinyl organophosphine compound in the presence of little to no monomer. In one or more embodiments, the reaction between the organolithium and the vinyl organophosphine takes place in the presence of less than 1 mole percent, in other embodiments less than 0.5 mole percent, and in other embodiments less than 0.1 mole percent monomer to vinyl organophosphine. In particular embodiments, the phosphorus-containing organometal compound is formed in the substantial absence of monomer, which refers to that amount of monomer or less that will not have an appreciable impact on the formation of the phosphorus-containing organometal or its use in anionic polymerization.

In one or more embodiments, the reaction between the organolithium and the vinyl organophosphine compound takes place within a solvent. In one or more embodiments, the solvent may be employed to either dissolve or suspend one or more of the organolithium, the vinyl organophosphine, or the phosphorus-containing organometal compound. Suitable solvents include those organic compounds that will not undergo polymerization or incorporation into a propagating polymer chain during polymerization of monomer in the presence of the phosphorus-containing organometal compound. In one or more embodiments, these organic solvents are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. The low-boiling hydrocarbon solvents are typically separated from the polymer upon completion of the polymerization. Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer. In yet other embodiments, examples of useful organic solvents include non-Zerwittenoff polar organic solvents. These solvents include, but are not limited to, ethers, such as dimethyl ether and diethyl ether, as well as cyclic ethers, such as tetrahydrofuran (THF) and 2,2-bis(2'-tetrahydrofuryl)propane. Other non-Zerwittenoff polar organic solvents include tertiary amines such as tri-n-butyl amine.

In one or more embodiments, the pre-formed solution concentration of the organolithium compound, the vinyl organophosphine compound, and/or the phosphorus-containing organometal compound within the solvent may be from about 5 M (molar) to about 0.005 M, in other embodiments from about 2 M to about 0.05 M, and in other embodiments from about 1.1 M to about 0.075 M.

In one or more embodiments, the reaction between the organolithium and the vinyl organophosphine compound may be conducted at a temperature from about −78° C. to about 100° C., in other embodiments from about 0° C. to about 75° C., and in other embodiments from about 10° C. to about 50° C. Also, this reaction can be conducted at atmospheric pressure. In one or more embodiments, the reaction is conducted under anaerobic conditions.

In one or more embodiments, the reaction between the organolithium and the vinyl organophosphine compound may take place in the presence of a polar coordinator. Compounds useful as polar coordinators include those compounds having an oxygen or nitrogen heteroatom and a non-bonded pair of electrons. Examples of useful polar coordinators include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as polar coordinators include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N—N'-dimethylpiperazine, diazabicyclooctane, dimethyl ether, diethyl ether, tri-n-butylamine, and mixtures thereof. When employed, the amount of polar coordinator present during the reaction between the organolithium and the vinyl organophosphine may be from about 10,000 to about 0.001, in other embodiments from about 100 to about 0.05, and in other embodiments from about 50 to about 0.1 moles per mole of the vinyl organophosphine.

Initiator Structure

While the vinyl organophosphine and the organometal are believed to react to form the phosphorus-containing organometal initiator, the exact chemical structure resulting from the reaction between all species is not known with a great deal of certainty. For example, the structure of the phosphorus-containing organometal initiators may depend on stability of the anion formed by a reaction with the organometal compound.

Without wishing to be bound by any particular theory, it is believed that in one or more embodiments, vinyldihydrocarbyl phosphines react to form phosphorus-containing organolithium compounds that can be defined by the formula II:

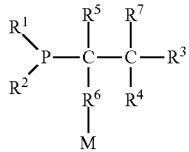

Formula II where M is a metal, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, and where $R^6$ is a bond or a divalent organic group. In particular embodiments, $R^3$, $R^4$, and $R^5$ are hydrogen atoms. In these or other particular embodiments, M is a group I (e.g. lithium) or group II (e.g. magnesium) metal. In these or other particular embodiments, $R^6$ is a divalent organic group defined by the formula III:

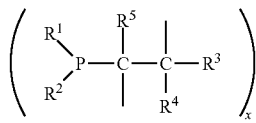

Formula III where $R^1$, $R^2$, $R^3$, $R^4$, and $R^5$ are defined as above, and x is an integer from 1 to 19. In particular embodiments, x is an integer from 1 to 10, and in other embodiments from 1 to 6. It is believed that molecules of the Formula II are obtained when, for example, butyl lithium is reacted with vinyl diphenyl phosphine.

With respect to Formula II, where $R^6$ is a substituent according to Formula III, it is believed that the alpha carbon of Formula III (i.e., the carbon next to the phosphorus atom) will be bonded to the metal atom (i.e., M) of Formula II, and the beta carbon of Formula III (i.e., the second carbon atom from the phosphorus atom) will be bonded to the alpha carbon of Formula II.

Again, without wishing to be bound by any particular theory, it is believed that certain substituted vinyl organophosphines, such as dihydrocarbyl(2-dihydrocarbylvinyl) phosphines, react to form phosphorus-containing organolithium compounds that can be defined by the formula IV:

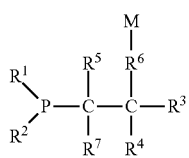

Formula IV where M is a metal, $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, and where $R^6$ is a bond or a divalent organic group. In particular embodiments, $R^3$, $R^4$, and $R^5$ are hydrocarbyl groups. In these or other particular embodiments, M is a group I (e.g. lithium) or group II (e.g. magnesium) metal.

In these or other particular embodiments, $R^6$ may be a divalent organic group defined by the Formula III. With respect to Formula IV, where $R^6$ is a substituent according to Formula III, it is believed that the beta carbon of Formula III will be bonded to the metal atom of Formula IV, and the alpha carbon of Formula III will be bonded to the beta carbon of Formula IV.

In one or more embodiments, a solvent may be employed as a carrier to either dissolve or suspend the initiator in order to facilitate the delivery of the initiator to the polymerization system. In other embodiments, monomer can be used as the carrier. In yet other embodiments, the initiator can be used in their neat state without any solvent.

In one or more embodiments, suitable solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

In one or more embodiments, stabilized solutions of the phosphorus-containing organometal initiator of this invention can be prepared by chain extending the initiator compound. The technique of chain extending anionic polymerization initiators is known in the art as described in U.S. Publication No. 2011/0112263 and U.S. Provisional Application Ser. No. 61/576,043, which are incorporated herein by reference. In general, this technique includes polymerizing a limited amount of monomer (e.g., 3 to 25 units of butadiene) to form a stabilized chain-extended initiator. These chain-extended initiators can be represented by the formulas II and IV above, where $R^6$ includes a divalent oligomeric substituent formed by the polymerization of the limited amount of monomer (i.e., 3 to 25 mer units).

Polymerization Process

In one or more embodiments, polydiene or diene copolymers, the latter of which may also be referred to as polydiene copolymers, are prepared by introducing the preformed phosphorus-containing organometal compound with monomer to be polymerized. It is believed that the polymerization proceeds by anionic polymerization of the monomer with the phosphorus-containing organometal compound serving as the initiator. As will be described in more detail below, the polymer, which includes a phosphorus-containing functional group at the head of the polymer chain, may be end-functionalized to produce a polymer having a functional group at the tail-end of the polymer (i.e., a telechelic polymer is produced).

In one or more embodiments, the monomer to be polymerized with the phosphorus-containing organometal includes conjugated diene monomer and optionally monomer copolymerizable therewith. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinyl naphthalene.

It is believed that use of the phosphorus-containing initiator produces polymers by anionic polymerization techniques or mechanisms. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). These initiators may advantageously produce living polymers that, prior to quenching, are capable of reacting with additional monomers for further chain growth or reacting with certain coupling and/or functionalizing agents to give coupled or terminal-functionalized polymers. As those skilled in the art appreciate, these reactive polymers include a reactive chain end, which is believed to be ionic, at which a reaction between a functionalizing and/or coupling agent and the polymer takes place.

Anionic polymerization may be conducted in polar solvents, non-polar solvents, and mixtures thereof. In one or more embodiments, a solvent may be employed as a carrier to either dissolve or suspend the initiator in order to facilitate the delivery of the initiator to the polymerization system. Solvents useful for conducting the polymerizations include those solvents mentioned above that are useful in preparing the initiator solutions. In particular embodiments, alkanes and/or cycloalkanes are employed.

In order to promote the randomization of comonomers in copolymerization and to control the microstructure (such as 1,2-linkage of conjugated diene monomer) of the polymer, a randomizer, which is typically a polar coordinator, may be employed along with the anionic initiator. Compounds useful as randomizers include those having an oxygen or nitrogen heteroatom and a non-bonded pair of electrons. Exemplary types of randomizers include linear and cyclic oligomeric oxolanyl alkanes; dialkyl ethers of mono and oligo alkylene glycols (also known as glyme ethers); crown ethers; tertiary amines; linear THF oligomers; alkali metal alkoxides; and alkali metal sulfonates. Linear and cyclic oligomeric oxolanyl alkanes are described in U.S. Pat. No. 4,429,091, which is incorporated herein by reference. Specific examples of randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N,N'-dimethylpiperazine, diazabicyclooctane, dimethyl ether, diethyl ether, tri-n-butylamine, potassium t-amylate, potassium 4-dodecylsulfonate, and mixtures thereof.

When preparing elastomeric copolymers, such as those containing conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator. Compounds useful as randomizers include those polar coordinators mentioned above. In other embodiments, useful randomizers include potassium alkoxides.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator. In one or more embodiments, the amount of randomizer employed includes that amount introduced during formation of the initiator (i.e., the lithium organophosphide). In other embodiments, additional randomizer is added to the monomer to be polymerized.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Production of the reactive polymer can be accomplished by polymerizing conjugated diene monomer, optionally together with monomer copolymerizable with conjugated diene monomer, in the presence of an effective amount of the initiator (i.e., the amount of phosphorus-containing organolithium compound). The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In one or more embodiments, the initiator loading (i.e., the amount of phosphorus-containing organolithium compound) may be varied from about 0.05 to about 100 mmol, in other embodiments from about 0.1 to about 50 mmol, and in still other embodiments from about 0.2 to about 5 mmol per 100 gram of monomer.

Polymerization System

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst or initiator is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, the polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a semi-batch process a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Additional Terminal Functionalization

In one or more embodiments, the polymers and copolymers produced using the anionic polymerization initiators according the present invention (e.g., the phosphorus-containing initiator) may have a reactive or living end. In one or more embodiments, at least about 30% of the polymer molecules contain living ends, in other embodiments at least about 50% of the polymer molecules contain living ends, and in other embodiments at least about 80% contain living ends.

These reactive polymers, which may also be referred to as living polymers, can be protonated or subsequently functionalized or coupled. Protonation can occur by the addition of any compound that can donate a proton to the living end. Examples include water, isopropyl alcohol, and methyl alcohol.

In one or more embodiments, the living or reactive polymer can be terminated with a compound that will impart a functional group to the terminus of the polymer. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as triisobutyltin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include cyclic sulfur-containing or oxygen containing azaheterocycles such as disclosed in WO 2004/020475, U.S. Publication No. 2006/0178467 and U.S. Pat. No. 6,596,798, which are incorporated herein by reference. Other examples include boron-containing terminators such as disclosed in U.S. Pat. No. 7,598,322, which is incorporated herein by reference. Still other examples include cyclic siloxanes such as hexamethylcyclotrisiloxane, including those disclosed in U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in U.S. Ser. Nos. 60/624,347 and 60/643,653, which are incorporated herein by reference. Yet other examples include silane-type terminators, such as 3-(1,3-dimethylbutylidene)aminopropyl-triethoxysilane. Still other examples include benzaldehyde-type terminators, such as 3,4-di(tert-butyldimethylsiloxy) benzaldehyde, which are disclosed in U.S. Publication No. 2010/0286348, which is incorporated herein by reference.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1_n M_{4-n}$, the formula (2) $M^1 X_4$, and the formula (3) $M^2 X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorus atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorus trichloride, phosphorus tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1{}_nM^1(OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent should be added within about 25 to 35 minutes of the peak polymerization temperature.

In one or more embodiments, the amount of the functionalizing agent employed can be described with reference to the amount of metal cation associated with the initiator. For example, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

In one or more embodiments, the functionalizing agent can be reacted with the reactive polymer after a desired monomer conversion is achieved but before the polymerization mixture is quenched by a quenching agent. In one or more embodiments, the reaction between the functionalizing agent and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below under an inert atmosphere. In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

The amount of the functionalizing agent that can be reacted with the reactive polymer may depend on various factors including the type and amount of initiator used to initiate the polymerization and the desired degree of functionalization. In one or more embodiments, the amount of the functionalizing agent employed can be described with reference to the amount of metal cation associated with the initiator. For example, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

Quenching

In one or more embodiments, in lieu of or after the reaction between the reactive polymer and the functionalizing agent has been accomplished or completed, a quenching agent can be added to the polymerization mixture in order to inactivate any residual reactive polymer chains and/or the initiator. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

Polymer Isolation

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Polymer Product

While the use of the phosphorus-containing initiator, optionally with a coupling agent and/or functionalizing agent, are believed to react to produce novel functionalized polymers, the exact chemical structure of the functionalized polymer produced in every embodiment is not known with any great degree of certainty, particularly as the structure relates to the residue imparted to the polymer chain end by the functionalizing agent. Indeed, it is speculated that the structure of the functionalized polymer may depend upon various factors such as the conditions employed to prepare the reactive polymer (e.g., the type and amount of the initiator) and the conditions employed to react the functionalizing agent with the reactive polymer.

In one or more embodiments, practice of the present invention advantageously produces polymer having a relatively high percentage of phosphorus-containing groups located at the head of the polymer chain. Thus, while the prior art contemplates the use of lithium dialkyl phosphides as initiators, practice of the present invention advantageously yields an unexpectedly higher number of polymer chains having a phosphorus-containing head group. Moreover, this is advantageously achieved at technologically useful polymerization conditions and rates, which generally include temperatures in excess of 25° C., in other embodiments in excess of 30° C., and in other embodiments in excess of 50° C. In one or more embodiments, the polymer produced according to the present invention includes at least 30%, in other embodiments at least 50%, and in other embodiments at least 60% polymer having a phosphorus-containing head group.

In one or more embodiments, polymers produced according to embodiments of the present invention may include a functionalized polymer defined by the formula V:

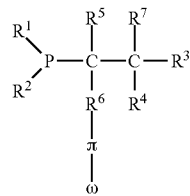

Formula V where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group. In the case where $\omega$ is a coupling group, $\omega$ may have a functionality of 2 or more (e.g., 3 or 4) whereby 2 or more polymer chains (i.e., $\pi$) extend from the coupling group.

In other embodiments, polymers produced according to the present invention may include a functionalized polymer defined by the formula VI:

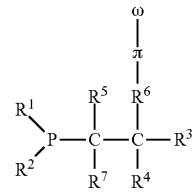

Formula VI where $R^1$ and $R^2$ are each independently monovalent organic groups, or where $R^1$ and $R^2$ join to form a divalent organic group, where $R^3$, $R^4$, and $R^5$ are each independently hydrogen or monovalent organic groups, or where $R^3$ and $R^4$ join to form a divalent organic group, where $R^6$ is a bond or a divalent organic group, P is a phosphorus atom, $\pi$ is a polymer chain, and $\omega$ is a hydrogen atom, a terminal functional group, or a multivalent coupling group. In the case where $\omega$ is a coupling group, $\omega$ may have a functionality of 2 or more (e.g., 3 or 4) whereby 2 or more polymer chains (i.e., $\pi$) extend from the coupling group.

In one or more embodiments, the polymer chain ($\pi$) of the functionalized polymer contains unsaturation. In these or other embodiments, the polymer chain is vulcanizable. The polymer chain can have a glass transition temperature ($T_g$) that is less than 0° C., in other embodiments less than −20° C., and in other embodiments less than −30° C. In one embodiment, the polymer chain may exhibit a single glass transition temperature.

In one or more embodiments, the polymer chain ($\pi$) prepared according to this invention may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1, 4-linkage configuration.

In particular embodiments, the polymer chain ($\pi$) may be a copolymer of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In one or more embodiments, the polymer chain ($\pi$) is a copolymer of styrene and conjugated diene where the molar ratio of styrene mer units to conjugated diene mer units is from about 1:1 to about 0.05:1, in other embodiments from about 0.7:1 to about 0.1:1, and in other embodiments from about 0.5:1 to about 0.2:1.

In one or more embodiments, the polymer chain $\pi$ is an anionically-polymerized polymer selected from the group consisting of polybutadiene, polyisoprene, poly(styrene-co-butadiene), polystyrene-co-butadiene-co-isoprene), poly(isoprene-co-styrene), and poly(butadiene-co-isoprene). The number average molecular weight ($M_n$) of these polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

In particular embodiments, the polymers of this invention are copolymers of 1,3-butadiene, styrene, and optionally isoprene. These may include random copolymers and block copolymers. In one or more embodiments, the random polydiene copolymers may include from about 10 to about 50% by weight, in other embodiments from about 15 to about 40% by weight, and in other embodiments from about 20 to about 30% by weight units deriving from styrene, with the balance including units deriving from conjugated diene monomer, such as 1,3-butadiene, having low or medium cis content as described above.

In particular embodiments, the functional group located at the chain end (i.e., $\omega$) can react or interact with reinforcing filler to reduce the 50° C. hysteresis loss of vulcanizates prepared there from.

Copolymerization with Vinyl Organophosphines

As indicated above, other aspects of the present invention are directed toward copolymers prepared by anionically polymerizing vinyl organophosphines with diene monomer, optionally together with polymer copolymerizable therewith. Conjugated diene monomer, as well as monomer copolymerizable therewith (e.g., styrene), are described above. Also, anionic polymerization techniques are described above.

The practice of these embodiments is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black filled vulcanizates prepared from polymers containing the functional group as compared to similar carbon-black filled vulcanizates prepared from polymer that does not include the functional group. In certain embodiments, the initiator employed may include the phosphorus-containing initiator described above.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium.

Other anionic initiators include alkylmagnesium halide compounds such as butylmagnesium bromide and phenylmagnesium bromide. Still other anionic initiators include organosodium compounds such as phenylsodium and 2,4,6-trimethylphenylsodium. Also contemplated are those anionic initiators that give rise to di-living polymers, wherein both ends of a polymer chain are living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include lithiated alkylthioacetals such as 2-lithio-2-methyl-1,3-dithiane. These and related useful initiators are disclosed in U.S. Publ. Nos. 2006/0030657, 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Publ. No. 2006/0241241, which is incorporated herein by reference.

In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

The amount of the vinyl organophosphine copolymerized with the conjugated diene may be described with reference to the conjugated diene monomer. In one or more embodiments, the mole ratio of the vinyl organophosphine to the conjugated diene monomer may be at least 0.0002:1, in other embodiments at least 0.001:1, and in other embodiments at least 0.005:1. In these or other embodiments, the mole ratio of the vinyl organophosphine to the conjugated diene monomer may be at most 1:1, in other embodiments at most 0.05:1, and in other embodiments at most 0.01:1. In one or more embodiments, the mole ratio of the vinyl organophosphine to the conjugated diene monomer may be from about 0.0002:1 to about 1:1, in other embodiments from about 0.001:1 to about 0.05:1, and in other embodiments from about 0.005:1 to about 0.01:1.

The amount of the copolymerizable monomer (e.g., vinyl aromatic) employed in practice of the present invention may be described with reference to the conjugated diene monomer. In one or more embodiments, the weight ratio of the copolymerizable monomer (e.g., vinyl aromatic) to the conjugated diene monomer may be at least 0:1, in other embodiments at least 0.05:1, in other embodiments at least 0.1:1, and in other embodiments at least 0.2:1. In these or other embodiments, the weight ratio of the copolymerizable monomer (e.g., vinyl aromatic) to the conjugated diene monomer may be at most 1:1, in other embodiments at most 0.8:1, and in other embodiments at most 0.6:1. In one or more embodiments, the weight ratio of the copolymerizable monomer (e.g., vinyl aromatic) to the conjugated diene monomer may be from about 0.05:1 to about 1:1, in other embodiments from about 0.1:1 to about 0.8:1, and in other embodiments from about 0.2:1 to about 0.6:1.

In one or more embodiments, the amount of anionic initiator (e.g., an alkyllithium compound) may be varied from about 0.05 to about 100 mmol, in other embodiments from about 0.1 to about 50 mmol, and in still other embodiments from about 0.2 to about 5 mmol per 100 gram of monomer.

As with the previous embodiments, the polymerization may be conducted in solution. Also, the polymerization may be conducted in the presence of a randomizer. And, the polymerization system may be the same as described above.

Regardless of the polymerization technique used, the introduction of the respective monomer (i.e., the conjugated diene monomer, the vinyl organophosphine monomer, and/or the vinyl aromatic monomer) may be accomplished by employing several techniques. In one embodiment, such as where a batch polymerization is conducted, a mixture of the respective monomer may be prepared, and the polymerization initiator may be subsequently charged to the mixture. In other embodiments, such as where a semi-batch polymerization technique is employed, the polymerization initiator may be charged to a reactor followed by the addition of monomer. The monomer may be charged by providing a blend of the respective monomer (e.g., a blend of conjugated diene monomer, vinyl organophosphine monomer, and optionally vinyl aromatic monomer). In one or more embodiments, this blend of monomer can be sequentially charged to the reactor in the form of two or more monomer charges. In other embodiments, one or more of the monomer can be separately charged to the reactor either simultaneously or sequentially with respect to the other monomer. For example, when using semi-batch techniques, a blend of conjugated diene monomer and vinyl aromatic monomer can be charged to the reactor, and the vinyl organophosphine monomer can be separately charged, either simultaneously with the conjugated diene monomer and vinyl aromatic monomer or sequentially during the course of the polymerization.

In those embodiments where there is a desire to concentrate the phosphorus-containing mer units at the tail end of the polymer, the vinyl organophosphine monomer can be sequentially charged to the reactor following completion or substantial completion of the polymerization of the conjugated diene monomer and optional vinyl aromatic monomer. In a similar fashion, when using continuous polymerization techniques, the vinyl organophosphine monomer can be separately added to the continuous reactor or at a downstream location where polymerization of the monomer will cause the vinyl organophosphine monomer to polymerize and provide phosphorus-containing mer units at or near the terminal end of the polymer.

As with the previous embodiments, the copolymer produced by polymerizing the vinyl organophosphine with conjugated diene may be end-functionalized. Also, the copolymer may be quenched and isolated as described above.

Copolymer Product

While practice of these embodiments are believed to react to produce novel functionalized polymers (i.e., polymers with a phosphorus-containing group), the exact chemical structure of the functionalized polymer produced in every embodiment may not be known with any great degree of certainty.

In one or more embodiments, the process of the present invention produces copolymers having one or more mer units defined by the formula VII:

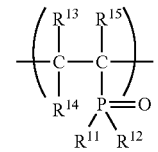

where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group. In particular embodiments, $R^{13}$, $R^{14}$, and $R^{15}$ are hydrogen atoms. In particular embodiments, $R^{13}$, $R^{14}$, and $R^{15}$ are hydrogen atoms. As the skilled person will understand, $R^{11}$, $R^{12}$, $R^{13}$ $R^{14}$, and $R^{15}$ derive from $R^{11}$, $R^{12}$, $R^{13}$ $R^{14}$, and $R^{15}$ of the vinyl organophosphine of formula I.

In one or more embodiments, the process of the present invention produces copolymers having one or more mer units defined by the formula VIII:

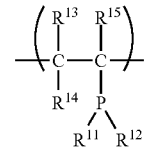

where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group. In particular embodiments, $R^{13}$, $R^{14}$, and $R^{15}$ are hydrogen atoms. In particular embodiments, $R^{13}$, $R^{14}$, and $R^{15}$ are hydrogen atoms. As the skilled person will understand, $R^{11}$, $R^{12}$, $R^{13}$ $R^{14}$, and $R^{15}$ derive from $R^{11}$, $R^{12}$, $R^{13}$ $R^{14}$, and $R^{15}$ of the vinyl organophosphine of formula I.

In one or more embodiments, the copolymers also include mer units deriving from the polymerization of conjugated diene monomer and optionally mer units deriving from the polymerization of monomer copolymerizable therewith (e.g., vinyl aromatic monomer, such as styrene monomer). As suggested from the discussion of the polymerization procedure set forth above, these copolymers may include at least 60%, in other embodiments at least 80%, in other embodiments at least 90%, in other embodiments at least 95%, in other embodiments at least 97%, in other embodiments at least 99%, and in other embodiments at least 99.5% of their mer units, on a mole basis, deriving from conjugated diene monomer or copolymerizable monomer other than the vinyl organophosphine monomer (e.g., styrene), with the balance including phosphorus-containing mer units deriving from the polymerization of vinyl organophosphine monomer. Stated another way, the copolymers of one or more embodiments may include up to 10 mole percent, in other embodiments up to 5 mole percent, in other embodiments up to 3 mole percent, in other embodiments up to 1 mole percent, in other embodiments up to 0.5 mole percent, and in other embodiments up to 0.25 mole percent mer units that are phosphorus-containing mer units deriving from the polymerization of vinyl organophosphine monomer.

For ease of description, the mer units deriving from the polymerization of the vinyl organophosphine may be referred to as phosphorus-containing mer units. In one or more embodiments, the phosphorus-containing mer units may be irregularly distributed along the backbone of the polymer chain among mer units deriving from the polymerization of conjugated diene monomer (which may be referred to as diene mer units) as well as mer units deriving from the polymerization of copolymerizable monomer such as units deriving from the polymerization of vinyl aromatic monomer (which may also be referred to as vinyl aromatic mer units). As the skilled person understands, polymers in which the mer units are irregularly distributed along the backbone may be referred to as statistical copolymers. In particular embodiments, these irregularly distributed mer units may be randomly distributed mer units. In yet other embodiments, the phosphorus-containing mer units may be in the form of blocks. In one or more embodiments, these blocks may be referred to as microblocks, which include blocks of about 3 to about 10 mer units. In other embodiments, these blocks may be referred to as macroblocks, which include blocks including greater than 10 mer units.

In one or more embodiments, practice of the present invention advantageously produces polymer having a relatively high percentage of phosphorus-containing groups located at the terminus of the polymer chain. In one or more embodiments, the copolymers of the present invention may include at least 1, in other embodiments at least 2, in other embodiments at least 3, in other embodiments at least 10, and in other embodiments at least 50 phosphorus-containing mer units located at or near the terminus of the polymer chain, where near the terminus of the polymer chain refers to 5 mole percent of the polymer adjacent to the location where the polymer is quenched or terminated. In these or other embodiments, the copolymer includes from about 1 to about 100, in other embodiments from about 2 to about 75, and in other embodiments from about 30 to about 50 phosphorus-containing mer units at or near the terminus of the polymer.

In one or more embodiments, where the phosphorus-containing groups are located at the terminus of the polymer chain, the polymer may be defined by the Formula IX:

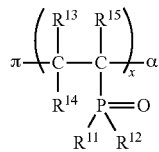

where π is a polymer chain, α is a hydrogen atom or functional group, and x is an integer from 1 to about 100.

In other embodiments, where the phosphorus-containing groups are located at the terminus of the polymer chain, the polymer may be defined by the Formula X:

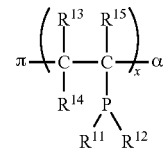

where Ti is a polymer chain, α is a hydrogen atom or functional group, and x is an integer from 1 to about 100. For purposes of Formulas IX and X, reference may be made to $R^{11}$—$R^{15}$ as described above, and reference may be made to the polymer chain π described above. In addition, the polymer chain π may include copolymers including one or more phosphorous-containing mer units, as described above.

In one or more embodiments, the copolymers of the present invention may be characterized by a number average molecular weight (Mn) of at least 1, in other embodiments at least 5, and in other embodiments at least 20 kg/mole. In these or other embodiments, the copolymers of the present invention may be characterized by an Mn of at most 10,000, in other embodiments at most 5,000, and in other embodiments at most 500 kg/mole. In one or more embodiments, the copolymers of the present invention may be characterized by an Mn of from about 1 to about 10,000, in other embodiments from about 5 to about 5,000, and in other embodiments from about 20 to about 500 kg/mole.

In one or more embodiments, the copolymers of the present invention may be characterized by a weight average molecular weight (Mw) of at least 1, in other embodiments at least 7, and in other embodiments at least 30 kg/mole. In these or other embodiments, the copolymers of the present invention may be characterized by an Mw of at most 10,000, in other embodiments at most 5,000, and in other embodiments at most 500 kg/mole. In one or more embodiments, the copolymers of the present invention may be characterized by an Mw of from about 1 to about 10,000, in other embodiments from about 7 to about 5,000, and in other embodiments from about 30 to about 500 kg/mole.

The copolymers of the present invention may be characterized by a molecular weight distribution (i.e., polydispersity) of less than 2, in other embodiments less than 1.5, and in other embodiments less than 1.3. In one or more embodiments, the conjugated diene mer units of the copolymers of the present invention may be characterized by a vinyl content of at least 15%, in other embodiments at least 20%, and in other embodiments at least 22%, on a mole basis. In these or other embodiments the vinyl content is from about 8 to about 80, in other embodiments from about 10 to about 70, and in other embodiments from about 15 to about 65 mole percent. In these or other embodiments, the conjugated diene mer units of the copolymers of the present invention may be characterized by a 1,4-trans microstructure of from about 40 to about 75, in other embodiments from about 45 to about 70, and in other embodiments from about 48 to about 65 mole percent. In these or other embodiments, the conjugated diene mer units of the copolymers of the present invention may be characterized by a 1,4-cis microstructure of from about 10 to about 60, in other embodiments from about 15 to about 55, and in other embodiments from about 20 to about 50 mole percent.

I. Use in Tires

The polymers and copolymers of this invention are particularly useful in preparing tire components. In particular embodiments, these tire components include silica filler. These tire components can be prepared by using the copolymers alone or together with other rubbery polymers (i.e., polymers that can be vulcanized to form compositions possessing elastomeric properties). Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, (2nd Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functionalized polymers or copolymers are employed in tread and sidewall formulations. In one or more embodiments, these tread formulations may include from about 10% to about 100% by weight, in other embodiments from about 35% to about 90% by weight, and in other embodiments from about 50% to 80% by weight of the copolymer based on the total weight of the rubber within the formulation.

In one or more embodiments, the vulcanizable rubber composition may be prepared by forming an initial masterbatch that includes the rubber component and filler (the rubber component optionally including the functionalized polymer or copolymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. For example, the vulcanizing agents may be introduced at a temperature less than 140° C., in other embodiments less than 120° C., and in other embodiments less than 110° C. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in The Compounding and Vulcanization of Rubber, in Rubber Technology (2nd Ed. 1973).

In order to demonstrate the practice of the present invention, the following examples have been prepared and tested. The examples should not, however, be viewed as limiting the scope of the invention. The claims will serve to define the invention.

Examples

Sample 1. Control Non-Functional Polymer

To a 7.57 L stainless steel reactor equipped with turbine agitator blades was added 1.55 kg hexanes, 0.39 kg 35.0 wt % styrene in hexanes, and 2.50 kg 21.8 wt % 1,3-butadiene in hexanes. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 87° C. Approximately 30 minutes after exotherm, a portion of the contents were discharged into isopropanol containing antioxidant (BHT). The polymer was drum dried to yield a polymer with properties listed in Table 1.

Sample 2. Synthesis of SBR Initiated with the
Butyl Lithium Adduct to Vinyldiphenylphosphine To a 7.57 L stainless steel reactor equipped with turbine agitator blades was added 1.55 kg hexanes, 0.39 kg 35.0 wt % styrene in hexanes, and 2.50 kg 21.8 wt % 1,3-butadiene in hexanes. To the reactor was charged a premixed solution (which is bright yellow in color) of 3.44 mL of 1.65 M n-butyl lithium in hexanes, 4.36 mL of 1.17 M vinyldiphenylphosphine in hexanes, and 2.06 mL of 1.60 M 2,2-ditetrahydrofurylpropane (DTHFP) in hexanes and the batch was heated to an exotherm of 88.3° C. Approximately 135 minutes after exotherm, part of the contents were discharged into isopropanol containing antioxidant (BHT). The polymer was drum dried to yield a polymer with properties listed in Table 1.

Sample 3. Synthesis of SBR Initiated with the
Butyl Lithium Adduct to Vinyldiphenylphosphine
and Terminated with Chlorodiphenylphosphine A portion of the contents from the polymerization in Sample 2 were discharged into nitrogen purged bottles and terminated with 1 equivalent of chlorodiphenylphosphine/BuLi. The polymer was coagulated in isopropanol containing antioxidant and drum dried to yield a polymer with properties listed in Table 1.

Sample 4. Synthesis of SBR Initiated with the Butyl Lithium Adduct to 2 Equivalents of Vinyldiphenylphosphine To a 7.57 L stainless steel reactor equipped with turbine agitator blades was added 1.50 kg hexanes, 0.39 kg 35.0 wt % styrene in hexanes, and 2.56 kg 21.3 wt % 1,3-butadiene in hexanes. To the reactor was charged a premixed solution (which is bright yellow in color) of 3.44 mL of 1.65 M n-butyl lithium in hexanes, 9.69 mL of 1.17 M vinyldiphenylphosphine in hexanes, and 3.54 mL of 1.60 M 2,2-ditetrahydrofurylpropane (DTHFP) in hexanes and the batch was heated to an exotherm of 84.4° C. Approximately 30 minutes after exotherm, part of the contents were discharged into isopropanol containing antioxidant (BHT). The polymer was drum dried to yield a polymer with properties listed in Table 1.

TABLE 1

Analytical Properties of Polymers

| Sample | $M_n$ (kg/mol) | $M_w$ (kg/mol) | $T_g$, ° C. | Styrene, wt % | % Vinyl (BD = 100%) | Phosphorus (ppm) | % Functionality |
|---|---|---|---|---|---|---|---|
| 1 | 117.1 | 123.4 | −36.0 | 20.6 | 54.6 | 2 | 0.7 |
| 2 | 121.3 | 133.7 | −32.9 | 22.5 | 51.7 | 196 | 76.9 |
| 3 | 117.6 | 128.4 | −32.9 | 22.5 | 51.7 | 408 | 77.4 |
| 4 | 128.5 | 200.5 | −30.2 | 21.4 | 58.0 | 348 | 69.3 |

$M_n$ and $M_w$ were measured using GPC with polystyrene standards. $T_g$ was measured using DSC. Styrene weight percent and vinyl content were determined using proton NMR. Phosphorus content was determined by using ICP (inductively coupled plasma); the reported functionality was calculated by ppm phosphorus found divided by theoretical ppm phosphorus times 100%. Theoretical phosphorus was calculated based upon phosphorus atoms in the polymer multiplied by phosphorus molecular weight divided by $M_n$ times 1,000,000.

Compounds 1A-3A. Compounding of Polymers in all Carbon Black Formulation

The formulations of the compound mixtures are presented in Table 2 in weight parts. Each rubber compound was prepared in two portions named initial (masterbatch) and final. In the initial part, the polymer from Samples 1-3 was mixed with carbon black, an antioxidant, stearic acid, wax, aromatic oil, and zinc oxide.

TABLE 2

Ingredients

| Masterbatch | |
|---|---|
| Synthetic Polymer | 100 |
| Carbon Black | 55 |
| Wax | 1 |
| Antioxidant | 0.95 |
| Zinc Oxide | 2.5 |
| Stearic Acid | 2 |
| Aromatic Oil | 10 |
| Total | 171.45 |
| Final | |
| Sulfur | 1.3 |
| Accelerators | 1.9 |
| Total | 174.65 |

The initial portion of the compound was mixed in a 65 g Banbury mixer operating at 60 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 60 RPM. The final material was removed from the mixer after 2.25 minutes when the material temperature was between 100-105° C. The finals were sheeted into Dynastat buttons and 15.2×15.2×0.19 cm sheets. The samples were cured at 171° C. for 15 minutes in standard molds placed in a hot press. The results of the various tests performed are reported in Table 3. Testing was conducted in a manner similar to that reported above.

TABLE 3

Physical Properties of Compounded Stocks

| Property | Compound 1A (Control) | Compound 2A | Compound 3A |
|---|---|---|---|
| $ML_{1+4}$ (130° C.) | 20.2 | 25.7 | 26.7 |
| 200% Modulus @ 23° C. (MPa) | 8.25 | 8.35 | 8.13 |
| $T_b$ @ 23° C. (MPa) | 15.8 | 14.9 | 12.60 |
| $E_b$ @ 23° C. (%) | 335 | 314 | 276 |
| tan δ 5% γ, 50° C. | 0.224 | 0.194 | 0.180 |
| ΔG' (50° C.) (MPa) | 3.420 | 2.360 | 1.800 |
| tan δ 0.5% γ, 0° C. | 0.398 | 0.399 | 0.406 |

The Mooney viscosities ($ML_{1+4}$) of the polymer samples were determined at 100° C. by using a Monsanto Mooney viscometer with a large rotor, a one-minute warm-up time, and a four-minute running time.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test.

Temperature sweep experiments were conducted with a frequency of 10 Hz using 0.5% strain for temperature ranging from −100° C. to −10° C., and 2% strain for the temperature ranging from −10° C. to 100° C. G' is the storage modulus measured at 10 Hz and 5% strain at 50° C. Payne Effect (ΔG') was estimated from the change in G' obtained from the strain sweep analysis conducted at a frequency of 1 Hz at 50° C. with strain sweeping from 0.25% to 14.00% using a Rheometric Dynamic Analyzer (RDA).

Compounds 1B-4B. Compounding of Polymers in all Silica Formulation

The formulations of the compound mixtures are presented in Table 4 in weight parts. Each rubber compound was prepared in three portions named initial (masterbatch), remill and final. In the initial part, the polymer from Samples 1-4 was mixed with silica, an antioxidant, stearic acid, wax, oil, and zinc oxide.

TABLE 4

| Ingredients | |
|---|---|
| Masterbatch | |
| Synthetic Polymer | 80 |
| Natural Rubber | 20 |
| Silica | 52.5 |
| Wax | 2 |
| Antioxidant | 0.95 |
| Stearic Acid | 2 |
| Oil | 10 |
| Total | 167.45 |
| Remill | |
| Silica | 2.5 |
| Silica Coupling Agent | 5 |
| Final | |
| Sulfur | 1.5 |
| Accelerators | 4.1 |
| Zinc Oxide | 1.5 |

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 15.2×15.2×0.19 inch sheets. The samples were cured at 171° C. for 15 minutes in standard molds placed in a hot press. The results of the various tests performed are reported in Table 5. Testing was conducted in a manner similar to that reported above.

TABLE 5

Physical Properties of Compounded Stocks

| Property | Compound 1B (Control) | Compound 2B | Compound 3B | Compound 4B |
|---|---|---|---|---|
| $ML_{1+4}$ (130° C.) | 15.5 | 21.6 | 23.5 | 53.3 |
| 200% Modulus @ 23° C. (MPa) | 7.48 | 7.99 | 8.13 | 9.01 |
| $T_b$ @23° C. (MPa) | 12.80 | 12.10 | 12.80 | 12.90 |
| $E_b$ @23° C. (%) | 308 | 276 | 283 | 259 |
| tan δ 5% γ, 50° C. (Strain Sweep) | 0.170 | 0.139 | 0.131 | 0.113 |
| ΔG' (50° C.) (MPa) | 4.330 | 3.460 | 2.580 | 1.500 |
| tan δ 0.5% γ, 0° C. (Temperature Sweep) | 0.331 | 0.352 | 0.352 | 0.418 |

Continuous Polymerization of SBR

Sample 5. Control Non-Functional Polymer

Polymerization was conducted in a 24.6 liter reactor with a 20 minute residence time. The reactor was filled with hexane and the jacket temperature was set at 88° C. The following ingredients were metered into the bottom of the reactor: 1) 3.0 kg/hr styrene/hexane blend (31.8% styrene), 2) 24.6 kg/hr butadiene/hexane blend (21.7% butadiene), 3) 8.6 kg/hr hexane, 4) 0.39 kg/hr DTHFP/hexane (0.10 M DTHFP), 5) 7.2 cc/hr 1,2-butadiene (20%), and 6) 0.35 kg/hr lithium initiator/hexane (0.125 M lithium). An additional stream of 10.6 kg/hr butadiene/hexane blend (21.7% butadiene) was added at the midpoint of the reactor to minimize block styrene formation. Polymer cement was removed at the top of the reactor into a storage vessel. After about 1-1.5 hours of polymerization time, steady state was achieved with the top temperature of the reactor at 99° C. and the bottom temperature at 91° C. After another hour of polymerization, samples were taken at the top of the reactor, drum-dried, and had the following properties: 31 ML4, 2.0 sec t-80, and 99.7% conversion (GC).

Sample 6. SBR Initiated with VDPP

Sample 6 was the same as Sample 5 with a couple of exceptions. Ingredient 4, DTHFP/hexane, was added at 0.37 kg/hr (0.10 M DTHFP). An additional ingredient, VDPP/hexane (0.18 kg/hr, 0.2 M VDPP) was mixed with ingredients 3, 4, 5, and 6 and allowed to mix for about 14 minutes prior to entering the bottom of the reactor. Polymer properties for Sample 6 were 33 ML4, 2.3 sec t-80, and 99.7% conversion.

TABLE 6

Analytical Properties of Polymers.

| Sample | Mn (kg/mol) | Mw (kg/mol) | Tg C. | Styrene, wt % | % Vinyl (BD = 100%) |
|---|---|---|---|---|---|
| 5 | 94 | 215 | −56.1 | 11.7 | 41.2 |
| 6 | 93 | 232 | −56.1 | 11.7 | 41.2 |

Compounds 5-6. Compounding of Polymers in all Silica Formulation.

The polymer samples prepared above were used to make rubber formulations (i.e., compounds) that were prepared using ingredients and a multi-stage mixing procedure as outlined in Table 4.

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 6×6×0.075 inch sheets. The samples were cured at 171° C. for 15 minutes in standard molds placed in a hot press. The results of the various tests performed are reported in Table 7.

TABLE 7

Physical Properties of Compounded Stocks.

| Property | Compound 5 (Control) | Compound 6 |
|---|---|---|
| $ML_{1+4}$ (130° C.) | 30.7 | 35.3 |
| 200% Modulus @23° C. (MPa) | 7.265 | 7.342 |
| $T_b$ @23° C (MPa) | 11.6 | 11.6 |
| $E_b$ @23° C (%) | 291 | 287.349 |
| tan δ 5% γ, 50° C. (Strain Sweep) | 0.1482 | 0.1419 |
| ΔG' (50° C.) (MPa) | 3.341 | 3.112 |
| tan δ 0.5% γ, 0° C. (Temperature Sweep) | 0.2020 | 0.1950 |

*☐ G'=G'(0.25% γ) − G'(14.0% γ)

Sample 7. Control Non-Functional Polymer

To a 7.57 L stainless steel reactor equipped with turbine agitator blades was added 1.54 kg hexanes, 0.37 kg 35.0 wt % styrene in hexanes, and 2.55 kg 21.7 wt % 1,3-butadiene in hexanes. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 87° C. Approximately 30 minutes after exotherm, a portion of the contents were discharged into isopropanol containing antioxidant (BHT). The polymer was drum dried to yield a polymer with properties listed in Table 8.

The number average (Mn) and weight average (Mw) molecular weights of the polymer samples were determined by gel permeation chromatography (GPC) using polystyrene standards adjusted using the Mark-Houwink constants for the polymer in question. The microstructure of the polymers was determined by $^1$HNMR spectroscopy using $CDCl_3$ as a solvent. Tg was determined by cooling the polymer to −120° C. and heating the polymer at 10° C./min; the Tg was recorded as the midpoint between onset and end point.

Sample 8. SBR End-Capped with 1 Eq Vinyldiphenylphosphine

To a 7.57 L stainless steel reactor equipped with turbine agitator blades was added 1.48 kg hexanes, 0.37 kg 35.0 wt % styrene in hexanes, and 2.59 kg 21.3 wt % 1,3-butadiene in hexanes. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 82° C. Approximately 30 minutes after exotherm, a portion of the contents were discharged into a dry, nitrogen purged glass bottle and treated with 1 mol vinyldiphenylphospine per mol polymer. The polymer was coagulated in isopropanol containing antioxidant (BHT) and drum dried to yield a polymer with properties listed in Table 8.

Sample 9. SBR End-Capped with 2 Eq Vinyldiphenylphosphine

A portion of the polymer sample made in the reactor in Sample 8 was discharged into a dry, nitrogen purged glass bottle and treated with 2 mol vinyldiphenylphosphine per mol polymer. The polymer was coagulated in isopropanol containing antioxidant (BHT) and drum dried to yield a polymer with properties listed in Table 8.

Sample 10. SBR End-Capped with 3 Eq Vinyldiphenylphosphine

A portion of the polymer sample made in the reactor in Sample 8 was discharged into a dry, nitrogen purged glass bottle and treated with 3 mol vinyldiphenylphosphine per mol polymer. The polymer was coagulated in isopropanol containing antioxidant (BHT) and drum dried to yield a polymer with properties listed in Table 8.

TABLE 8

| Polymer Sample | Mn (kg/mol) | Mw (kg/mol) | Tg, ° C. | Styrene, wt % | % Vinyl (BD = 100%) |
|---|---|---|---|---|---|
| 7 | 110.7 | 116.2 | −36.6 | 20.1 | 53.4 |
| 8 | 108.5 | 117.0 | −34.1 | 20.9 | 55.4 |
| 9 | 108.6 | 115.5 | −34.1 | 20.9 | 55.4 |
| 10 | 107.9 | 115.1 | −34.1 | 20.9 | 55.4 |

Compounds 7-10. Compounding of Polymers in all Silica Formulation.

The polymer samples prepared above were used to make rubber formulations (i.e., compounds) that were prepared using ingredients and a multi-stage mixing procedure as outlined in Table 4.

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 15.24 cm×15.24 cm×0.19 cm sheets. The samples were cured at 171° C. for 15 minutes in standard molds placed in a hot press. The cured and uncured properties of the rubber compounds were tested for dynamic and/or mechanical properties, and the results of these tests are set forth in Table 9.

TABLE 9

| Property | Compound 7 | Compound 8 | Compound 9 | Compound 10 |
|---|---|---|---|---|
| ML1 + 4 (130° C.) | 18.4 | 22.1 | 23.2 | 25.6 |
| 200% Modulus @23° C. (MPa) | 7.93 | 8.12 | 8.22 | 8.29 |
| $T_b$ @23° C. (MPa) | 10.5 | 14.7 | 13.7 | 13.7 |
| $E_b$ @23° C. (%) | 247 | 306 | 287 | 286 |
| tan δ 5% γ, 60° C. | 0.167 | 0.142 | 0.135 | 0.119 |
| ΔG' (60° C.) (MPa)* | 6.490 | 2.530 | 1.730 | 1.320 |
| tan δ 0.5% γ, 0° C. | 0.292 | 0.168 | 0.339 | 0.355 |

*ΔG' = G'(0.25% γ) − G'(14.0% γ)

Sample 11. Control Non-Functional Polymer

To a 7.57 L stainless steel reactor equipped with turbine agitator blades was added 1.54 kg hexanes, 0.38 kg 35.0 wt % styrene in hexanes, and 2.53 kg 21.7 wt % 1,3-butadiene in hexanes. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 73.8° C. Approximately 30 minutes after exotherm, a portion of the contents were discharged into isopropanol containing antioxidant (BHT). The polymer was drum dried to yield a polymer with properties listed in Table 10.

Sample 12. SBR Copolymerized with 0.9 Eq Vinyldiphenylphosphine Per Polymer and Terminated with N-1,3-(Dimethylbutylidene)-3-(Triethoxysilyl)-1-Propylamine To a 7.57 L stainless steel reactor equipped with turbine agitator blades was added 1.44 kg hexanes, 0.38 kg 35.0 wt % styrene in hexanes, 2.63 kg 20.9 wt % 1,3-butadiene in hexanes and 4.40 mL of 1.16 M vinyldiphenylphosphine. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 79° C. Approximately 30 minutes after exotherm, a portion of the contents were discharged into a dry, nitrogen purged glass bottle and treated with 0.9 mol N-1,3-(dimethylbutylidene)-3-(triethoxysilyl)-1-propylamine per mol polymer. The polymer was coagulated in isopropanol containing antioxidant (BHT) and drum dried to yield a polymer with properties listed in Table 10.

Sample 13. SBR Copolymerized with 0.9 Eq Vinyldiphenylphosphine Per Polymer and Terminated with Isopropanol A portion of the polymer sample made in the reactor in Sample 12 was discharged into isopropanol containing antioxidant (BHT) and drum dried to yield a polymer with properties listed in Table 10.

Sample 14. SBR Copolymerized with 2 Eq Vinyldiphenylphosphine Per Polymer and Terminated with N-1,3-(dimethylbutylidene)-3-(triethoxysilyl)-1-propylamine To a 7.57 L stainless steel reactor equipped with turbine agitator blades was added 1.44 kg hexanes, 0.38 kg 35.0 wt % styrene in hexanes, 2.63 kg 20.9 wt % 1,3-butadiene in hexanes and 9.78 mL of 1.16 M vinyldiphenylphosphine. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 82° C. Approximately 30 minutes after exotherm, a portion of the contents were discharged into a dry, nitrogen purged glass bottle and treated with 0.9 mol N-1,3-(dimethylbutylidene)-3-(triethoxysilyl)-1-propylamine per mol polymer. The polymer was coagulated in isopropanol containing antioxidant (BHT) and drum dried to yield a polymer with properties listed in Table 10.

Sample 15. SBR Copolymerized with 2 Eq Vinyldiphenylphosphine Per Polymer and Terminated with Isopropanol A portion of the polymer sample made in the reactor in Sample 14 was discharged into isopropanol containing antioxidant (BHT) and drum dried to yield a polymer with properties listed in Table 10

Sample 16. SBR Copolymerized with 3 Eq Vinyldiphenylphosphine Per Polymer and Terminated with N-1,3-(dimethylbutylidene)-3-(triethoxysilyl)-1-propylamine To a 7.57 L stainless steel reactor equipped with turbine agitator blades was added 1.44 kg hexanes, 0.38 kg 35.0 wt % styrene in hexanes, 2.63 kg 20.9 wt % 1,3-butadiene in hexanes and 14.66 mL of 1.16 M vinyldiphenylphosphine. To the reactor was charged 3.44 mL of 1.65 M n-butyl lithium in hexanes, 2.06 mL of 1.60 M 2,2-ditetrahydrofurylpropane (DTHFP) in hexanes and the batch was heated to an exotherm of 85° C. Approximately 30 minutes after exotherm, a portion of the contents were discharged into a dry, nitrogen purged glass bottle and treated with 0.9 mol N-1,3-(dimethylbutylidene)-3-(triethoxysilyl)-1-propylamine per mol polymer.

The polymer was coagulated in isopropanol containing antioxidant (BHT) and drum dried to yield a polymer with properties listed in Table 10.

Sample 17. SBR Copolymerized with 3 Eq Vinyldiphenylphosphine Per Polymer and Terminated with Isopropanol A portion of the polymer sample made in the reactor in sample 16 was discharged into isopropanol containing antioxidant (BHT) and drum dried to yield a polymer with properties listed in Table 10.

TABLE 10

| Polymer Sample | Mn (kg/mol) | Mw (kg/mol) | Styrene, wt % | % Vinyl (BD = 100%) | Phosphorus (ppm) | Average Phosphine/Chain |
|---|---|---|---|---|---|---|
| 11 | 94.3 | 99.2 | 21.9 | 58.0 | N/A | 0 |
| 12 | 109.5 | 141.9 | 20.6 | 57.5 | 155 | 0.55 |
| 13 | 111.4 | 118.8 | 20.6 | 57.5 | 165 | 0.59 |
| 14 | 118.7 | 147.0 | 21.9 | 54.9 | 250 | 0.96 |
| 15 | 115.7 | 125.8 | 21.9 | 54.9 | 310 | 1.16 |
| 16 | 109.0 | 138.7 | 20.6 | 50.8 | 580 | 2.03 |
| 17 | 109.8 | 120.2 | 20.6 | 50.8 | 375 | 1.33 |

Compounds 11-17. Compounding of Polymers in all Silica Formulation.

The polymer samples prepared in Samples 11-17 were used to make rubber formulations using ingredients and a multi-stage mixing procedure as outlined in Table 4 above.

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initials were mixed for 5-6 minutes. At the end of mixing the temperature was approximately 165° C. The sample was transferred to a mill operating at a temperature of 60° C., where it was sheeted and subsequently cooled to room temperature.

The remills were mixed by adding the initials and silica and shielding agent to the mixer simultaneously. The initial mixer temperature was 133° C. and it was operating at 50 RPM. The initial material was removed from the mixer after 3.5 minutes when the material temperature was between 145° C. and 150° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 45 RPM. The final material was removed from the mixer after 2.5 minutes when the material temperature was between 100-105° C. The finals were sheeted into Dynastat buttons and 15.24 cm×15.24 cm×0.19 cm sheets. The samples were cured at 171° C. for 15 minutes in standard molds placed in a hot press. Also, using similar procedures as set forth above, the cured and uncured rubber compounds were tested for dynamic and/or mechanical properties, the results of which are set forth in Table 11.

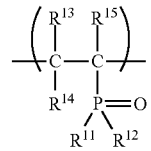

Formula VII where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group, where the phosphorus-containing mer units are irregularly distributed or randomly distributed along the backbone of the copolymer among mer units derived from the polymerization of conjugated diene monomer, where the copolymer has a number average molecular weight of from about 1 to about 10,000 kg/mole, where the copolymer has a molecular weight distribution that is less than 2.

2. The copolymer of claim 1, where the phosphorus-containing mer units are irregularly distributed along the backbone of the copolymer among mer units derived from the polymerization of conjugated diene monomer.

3. The copolymer of claim 1, where the phosphorus-containing mer units are randomly distributed along the backbone of the copolymer among mer units derived from the polymerization of conjugated diene monomer.

4. The copolymer of claim 1, where the phosphorus-containing mer units are concentrated near the terminus of the polymer chain.

5. The copolymer of claim 1, where the copolymer includes mer units deriving from the polymerization of

TABLE 11

| Property | Compound 11 | Compound 12 | Compound 13 | Compound 14 | Compound 15 | Compound 16 | Compound 17 |
|---|---|---|---|---|---|---|---|
| ML1 + 4 (130° C.) | 11.6 | 15.5 | 22.7 | 26 | 36 | 50.2 | 66.9 |
| Bound Rubber | 15.0 | 56.8 | 16.3 | 59.9 | 27.3 | 67.2 | 38.7 |
| tan δ 5% γ, 60° C. | 0.162 | 0.084 | 0.150 | 0.078 | 0.135 | 0.076 | 0.112 |
| ΔG' (60° C.) (MPa)* | 4.42 | 0.74 | 4.17 | 0.51 | 2.67 | 0.56 | 1.24 |
| tan δ 0.5% γ, 0° C. | 0.385 | 0.415 | 0.360 | 0.407 | 0.361 | 0.309 | 0.315 |

Various modifications and alterations that do not depart from the scope and spirit of this invention will become apparent to those skilled in the art. This invention is not to be duly limited to the illustrative embodiments set forth herein.

What is claimed is:

1. A copolymer having one or more phosphorus-containing mer units defined by the formula VII:

conjugated diene monomer, and where these mer units have a vinyl content of at least 15 mole percent.

6. A copolymer having one or more phosphorus-containing mer units defined by the formula VIII:

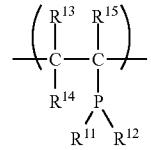

Formula VIII where $R^{11}$ and $R^{12}$ are each independently monovalent organic groups, or where $R^{11}$ and $R^{12}$ join to form a divalent organic group, and where $R^{13}$, $R^{14}$, and $R^{15}$ are each independently hydrogen or monovalent organic groups, or where $R^{13}$ and $R^{14}$ join to form a divalent organic group, where the phosphorus-containing mer units are irregularly distributed or randomly distributed along the backbone of the copolymer among mer units derived from the polymerization of conjugated diene monomer, where the copolymer has a number average molecular weight of from about 1 to about 10,000 kg/mole, where the copolymer has a molecular weight distribution that is less than 2.

7. The copolymer of claim 6, where the phosphorus-containing mer units are irregularly distributed along the backbone of the copolymer among mer units derived from the polymerization of conjugated diene monomer.

8. The copolymer of claim 6, where the phosphorus-containing mer units are randomly distributed along the backbone of the copolymer among mer units derived from the polymerization of conjugated diene monomer.

9. The copolymer of claim 6, where the phosphorus-containing mer units are concentrated near the terminus of the polymer chain.

10. The copolymer of claim 6, where the copolymer includes mer units deriving from the polymerization of conjugated diene monomer, and where these mer units have a vinyl content of at least 15 mole percent.

\* \* \* \* \*